UNITED STATES PATENT OFFICE.

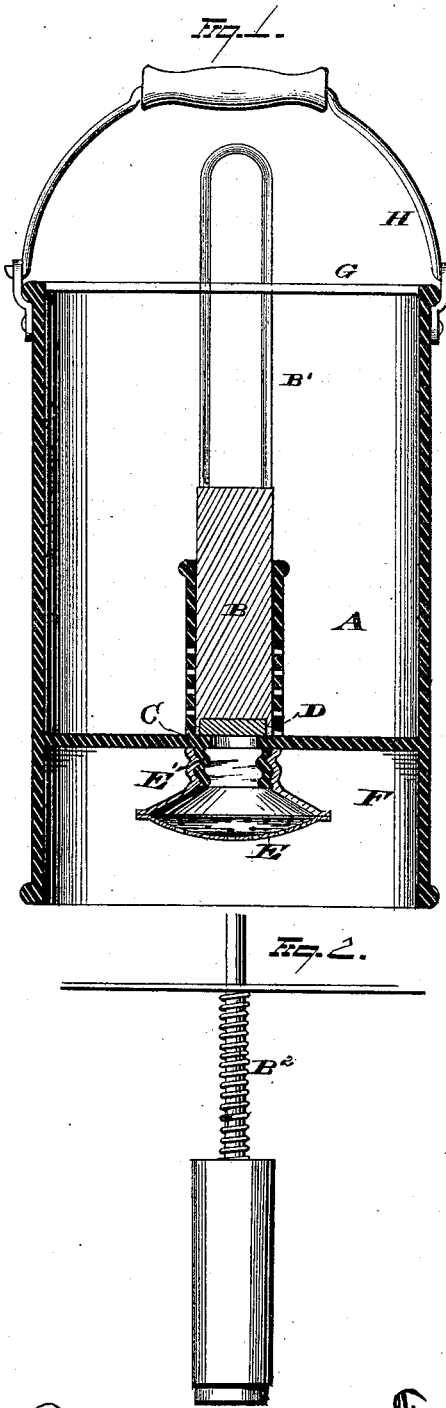

FREDRICK J. McDONALD, OF MADISON, OHIO.

IMPROVEMENT IN INSECT-DESTROYERS.

Specification forming part of Letters Patent No. 193,417, dated July 24, 1877; application filed June 16, 1877.

*To all whom it may concern:*

Be it known that I, FREDRICK J. McDONALD, of Madison, in the county of Lake and State of Ohio, have invented certain new and useful Improvements in Sprinklers for Destroying Insects; and I do hereby declare the following to be a full, clear, and exact description of the invention, such as will enable others skilled in the art to which it pertains to make and use it, reference being had to the accompanying drawings, which form part of this specification.

My invention relates to an insect-destroyer; and consists in a can provided with a sprinkler in its bottom, and a valve governable by the hand with which the bucket is carried, and designed to sprinkle any poisonous solution—such as paris-green—upon plants that are infested with bugs or vermin.

In the drawing, Figure 1 is a longitudinal central section of a can or bucket embodying my invention. Fig. 2 represents a variation of my invention.

A is a bucket of any suitable construction. B is a valve, provided with a valve-stem or handle, $B^1$, which projects up, so as to be readily operated by a finger of the hand with which the operator carries the bucket. C is the valve-seat; D, a perforated or gauze screen or strainer surrounding the valve. E is a rose or sprinkler located beneath the bucket, in a recess, F, formed in the bottom of the bucket for the purpose. The rose E is made, preferably, with a screw-shank, so as to be secured upon the stem $E'$.

In use, I prefer to employ several sizes of rose—the small ones for small plants, and the larger ones for larger plants, in order to economize and utilize the solution.

The valve B is weighted, as shown. G is a cross-piece, which supports the valve-stem $B^1$. H is the bail.

It is obvious that the strainer D may be in the nature of perforated metal, as shown, or it may be wire-gauze, or any other suitable metallic or other strainer. The strainer beneath the bucket, and inclosed within the recess, is not in the way in carrying the bucket, and is protected from injury. So, also, it can be conveniently swung with the hand over any plant, and a spray discharged without liability of throwing it upon the person.

The operation is obvious, and is substantially as follows: A solution of poison—as, for instance, paris-green—is placed within the bucket, the bucket is carried to the plant that may be infested with bugs or vermin, is held over the same, and the valve simply lifted with the finger; the solution passes through the sieve or strainer D, which prevents any dirt or granules of salt from passing into the rose. The solution passes thence through the rose, and is delivered, in the form of a spray, upon the plant.

It is apparent that this device is convenient in use, as the operator may have one hand free to push aside the leaves or vines of plants upon which the spray is to be delivered from the bucket from the other hand. So, also, instead of weighting the valve B, a spring, $B^2$, may be employed instead of the weight, as shown in the variation in Fig. 2. The object of the spring or weight is to hold the valve firmly to its seat.

What I claim is—

1. An insect-destroying apparatus, consisting of a can provided with a rose, recessed beneath the bottom of the can, and a valve for admitting liquid poison through the rose, and governable by the finger-hold, substantially as and for the purposes described.

2. The apparatus for destroying insects upon plants, consisting of the bucket or can A, valve B, with handle $B^1$, rose E, and recess F, substantially as and for the purposes described.

3. The combination of the can or bucket A, valve B, with handle $B^1$, rose E, and strainer D, substantially as and for the purposes described.

4. The combination, with a cylinder provided with an intermediate diaphragm, of a rose located below the same, a perforated cylinder secured to the upper face of the diaphragm, and a piston-valve operating therein, substantially as described.

5. The combination, with a cylinder provided with an intermediate diaphragm, of a discharge-rose located beneath the diaphragm, of a perforated cylinder secured to the upper face of said diaphragm, a piston-valve working inside of the cylinder, and a valve-stem extending upwardly in close proximity to the bail, substantially as and for the purposes set forth.

In testimony whereof I have signed my name to this specification in the presence of two subscribing witnesses.

FREDRICK J. McDONALD.

Witnesses:
FRANCIS TOUMEY,
W. E. DONNELLY.